(12) United States Patent
DePayva et al.

(10) Patent No.: US 7,509,948 B1
(45) Date of Patent: Mar. 31, 2009

(54) VARIABLE DISPLACEMENT PUMP WITH AN ANTI-STICTION DEVICE

(75) Inventors: Jeffrey M. DePayva, Dunlap, IL (US); Daniel R. Puckett, Peoria, IL (US); Gregory William Hefler, Chillicothe, IL (US); Todd A Johnson, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/865,523

(22) Filed: Oct. 1, 2007

(51) Int. Cl.
*F02M 37/04* (2006.01)
*F16K 3/10* (2006.01)
*F16K 31/02* (2006.01)

(52) U.S. Cl. .................. 123/506; 251/129.16; 137/238

(58) Field of Classification Search ................ 123/509; 251/129.15, 129.16; 137/238
See application file for complete search history.

(56) References Cited

U.S. PATENT DOCUMENTS

| | | | |
|---|---|---|---|
| 4,390,130 A * | 6/1983 | Linssen et al. ........... | 239/585.3 |
| 4,655,396 A | 4/1987 | Taxon et al. | |
| 4,909,447 A | 3/1990 | Gallup et al. | |
| 4,941,447 A | 7/1990 | Mannhardt | |
| 5,033,716 A | 7/1991 | Mesenich | |
| RE34,591 E | 4/1994 | Yoshida et al. | |
| 5,341,994 A | 8/1994 | Wakeman | |
| 5,381,965 A | 1/1995 | Chabon et al. | |
| 5,381,966 A * | 1/1995 | Gernert, II ............... | 239/585.3 |
| 5,540,564 A | 7/1996 | Klopfer | |
| 6,220,275 B1 * | 4/2001 | Nishinosono et al. ....... | 137/238 |
| 6,422,488 B1 * | 7/2002 | Fochtman et al. ......... | 239/585.5 |
| 6,505,112 B1 | 1/2003 | Merminod et al. | |
| 6,874,751 B2 * | 4/2005 | Ojima et al. ........... | 251/129.15 |
| 6,991,219 B2 | 1/2006 | Aharonov et al. | |
| 7,007,869 B2 | 3/2006 | Lewentz et al. | |
| 7,106,158 B2 * | 9/2006 | Forsythe et al. ............. | 335/220 |
| 7,290,564 B2 * | 11/2007 | Takahashi et al. ...... | 137/625.25 |
| 2006/0131531 A1 * | 6/2006 | Ohmori et al. ......... | 251/129.15 |
| 2006/0138374 A1 | 6/2006 | Lucas et al. | |

* cited by examiner

*Primary Examiner*—Thomas N Moulis
(74) *Attorney, Agent, or Firm*—Leydig, Voit & Mayer, Ltd

(57) ABSTRACT

A spacer for use with, and to prevent or reduce the occurrence of stiction in, a fluid device such as a pump. The spacer has a generally ring-shaped body, which has first and second facing surfaces separated by a thickness. The spacer is positioned between a movable member of the pump and a stationary member of the pump such that the first facing surface of the spacer is contactable with the movable member and the second facing surface is contactable with the stationary member. The spacer has at least a fluid receiving groove formed in at least one of the first and second facing surfaces.

8 Claims, 4 Drawing Sheets

VARIABLE DISPLACEMENT PUMP WITH AN ANTI-STICTION DEVICE

TECHNICAL FIELD

This patent disclosure relates generally to reducing or preventing the occurrence of stiction in hydraulic devices, and more particularly, to an anti-stiction device for reducing or preventing the occurrence stiction in a variable displacement pump.

BACKGROUND

In one class of fluid systems, such as common rail fuel systems for internal combustion engines, a variable displacement pump provides pressurized fluid to a common rail, which then transmits the pressurized fluid to a plurality of fuel injectors. These variable displacement pumps maintain the common rail at a desired pressure by utilizing a spill valve to controllably displace fluid to the common rail or to a low pressure reservoir. For example, in these pumps, when a piston is undergoing a pumping stroke within a chamber, pressurized fluid displaced from the chamber either passes through a check valve to the common rail or through the spill valve to the low pressure reservoir. If the spill valve is open, then the pressurized fluid passes through the spill valve and into the low pressure reservoir, which is the path of least resistance. However, if the spill valve is closed, pressure inside of the chamber quickly increases and the pressurized fluid is forced through the check valve and into the common rail. Accordingly, by controlling the frequency at which the spill valve cycles between open and closed positions, the plump selectively provides pressurized fluid to the common rail for maintaining the stability of the pressure therein.

Spill valves used in known variable displacement pumps typically include a valve stem connected to a solenoid-operated armature and extending through a middle passage of a valve block. A valve seat can be formed in one end of the valve block for receiving a sealing surface formed on one end of the valve stem. A contact surface, located in a facing relationship with the armature, can be formed on the other end of the valve block. The solenoid energizes and de-energizes for moving the armature out of and in to contact with the contact surface and for seating and unseating the sealing surface of the valve stem in and out of the valve seat. Oftentimes, however, these known pumps include an annular spacer located between the contact surface of the valve block and the armature. The spacer is typically fixed to, and movable with, the armature. As such, the spacer, not the armature, makes contact with the contact surface of the valve block.

The spill valve is typically open when the solenoid is de-energized. In this position, the armature and the annular spacer rest against the contact surface of the valve block and the valve assembly projects a distance out of the other side of the valve block such that an opening exists between the sealing surface and the valve seat. The spill valve is typically closed when the solenoid is energized. When energized, the solenoid causes the armature, including the spacer, to move upward, away from the contact surface of the valve block. This upward movement of the armature separates the spacer from the contact surface and retracts the valve assembly into the valve block causing the sealing surface to seat in the valve seat. When the solenoid is de-energized, therefore, the spill valve is open and no fuel is delivered to the rail. On the other hand, when the solenoid is energized, the spill valve is closed and fuel is delivered to the rail.

While these known variable discharge pumps are suitable for many purposes, they are not always well suited for use with modern hydraulically actuated fuel systems, which require fluid delivery to the rail to be varied with high precision and with rapid response times measured in microseconds. For example, these known variable discharge pumps may not be well suited for use with modern fuel systems in cold weather conditions, such as when an engine is undergoing a cold start. This is because, at cold temperatures, the pressurized fluid becomes viscous causing a sticking phenomenon occur where the spacer contacts the contact surface of the valve block. This sticking phenomenon inhibits or delays the ability of the armature, including the spacer, to break free from the contact surface of the valve block. This sticking phenomenon is sometimes referred to as stiction, which may be caused by a relatively thin but highly viscous fluid layer between the spacer and the contact surface. Stiction, by decreasing the response time of the armature, inhibits the pump's ability to control the frequency at which the spill valve cycles between open and closed positions. Accordingly, stiction may result in rail pressure instability.

It should be appreciated that the foregoing background discussion is intended solely to aid the reader. It is not intended to limit the disclosure or claims, and thus should not be taken to indicate that any particular element of a prior system is unsuitable for use, nor is it intended to indicate any element to be essential in implementing the examples described herein, or similar examples.

SUMMARY

The disclosure describes, in one aspect, a spacer for use with, and to prevent or reduce the occurrence of stiction in, a fluid device such as a pump. In an embodiment, the pump has a valve member connected to a movable member and extending through a stationary member, which has a valve seat for receiving a sealing surface of the valve member. The movable member is movable toward and away from the stationary member for seating and unseating the sealing surface of the valve member in and out of the valve seat. The spacer is generally ring-shaped, with first and second facing surfaces separated by a thickness. The spacer is positioned between the movable member and the stationary member such that the first facing surface of the spacer is contactable with the movable member and the second facing surface is contactable with the stationary member. The spacer has at least a fluid receiving groove formed in at least one of the first and second facing surfaces. In an embodiment, a plurality of fluid receiving grooves are circumferentially spaced about an outer edge of the spacer.

DETAILED DESCRIPTION

This disclosure relates to a device for reducing or preventing stiction from occurring in hydraulic devices. In particular, an anti-stiction spacer for reducing or preventing stiction in a variable displacement pump, which may be used in a fuel system for providing pressurized fluid to a common rail. The anti-stiction spacer, by reducing or preventing stiction, may increase the effectiveness of the pump and thereby increase the stability of the fluid pressure in the rail.

Figure 1:
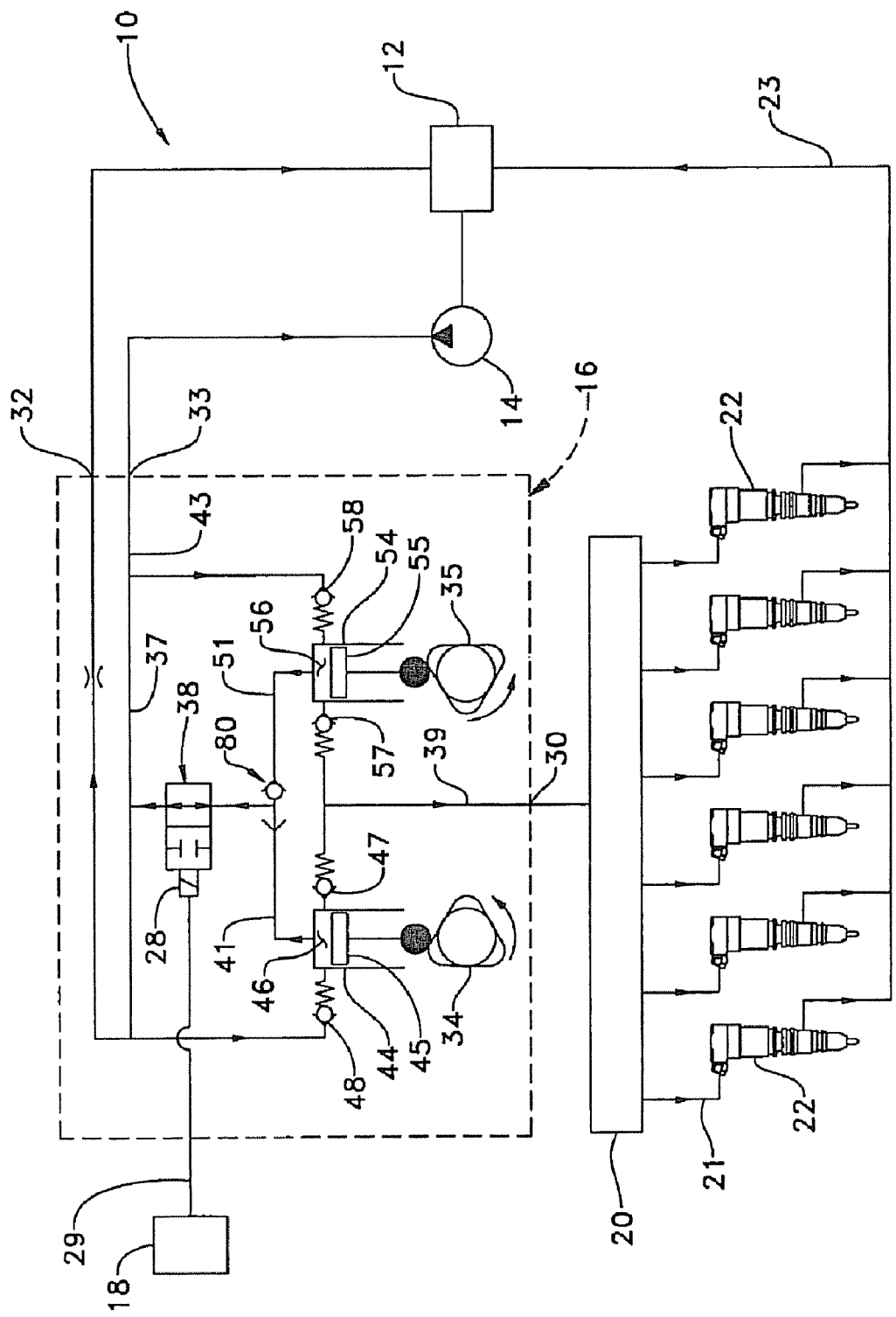
FIG. 1 is a schematic illustration of a common rail fuel system according to one aspect of the present invention.

Referring to FIG. 1, a fuel system 10 includes a plurality of fuel injectors 22, which are each connected to a high pressure fuel rail 20 via an individual branch passage 21. The high pressure fuel rail 20 is supplied with high pressure fuel from a fluid device 16, such as a variable displacement pump, which is supplied with relatively low pressure fluid by a fuel transfer pump 14. The fuel transfer pump 14 draws fuel from a fuel tank 12, which is also fluidly connected to the fuel injectors 22 via a leak return passage 23. The fuel system 10 is controlled in its operation in a conventional manner via an electronic control module 18, which is connected to an electrical actuator 28 of the pump 16 via a control communication line 29, and connected to the individual fuel injectors 22 via other communication lines (not shown). When in operation, control signals generated by electronic control module 18 determine when and how much fuel displaced by pump 16 is forced into common rail 20, as well as when and for what duration the fuel injectors 22 operate.

Figure 2:
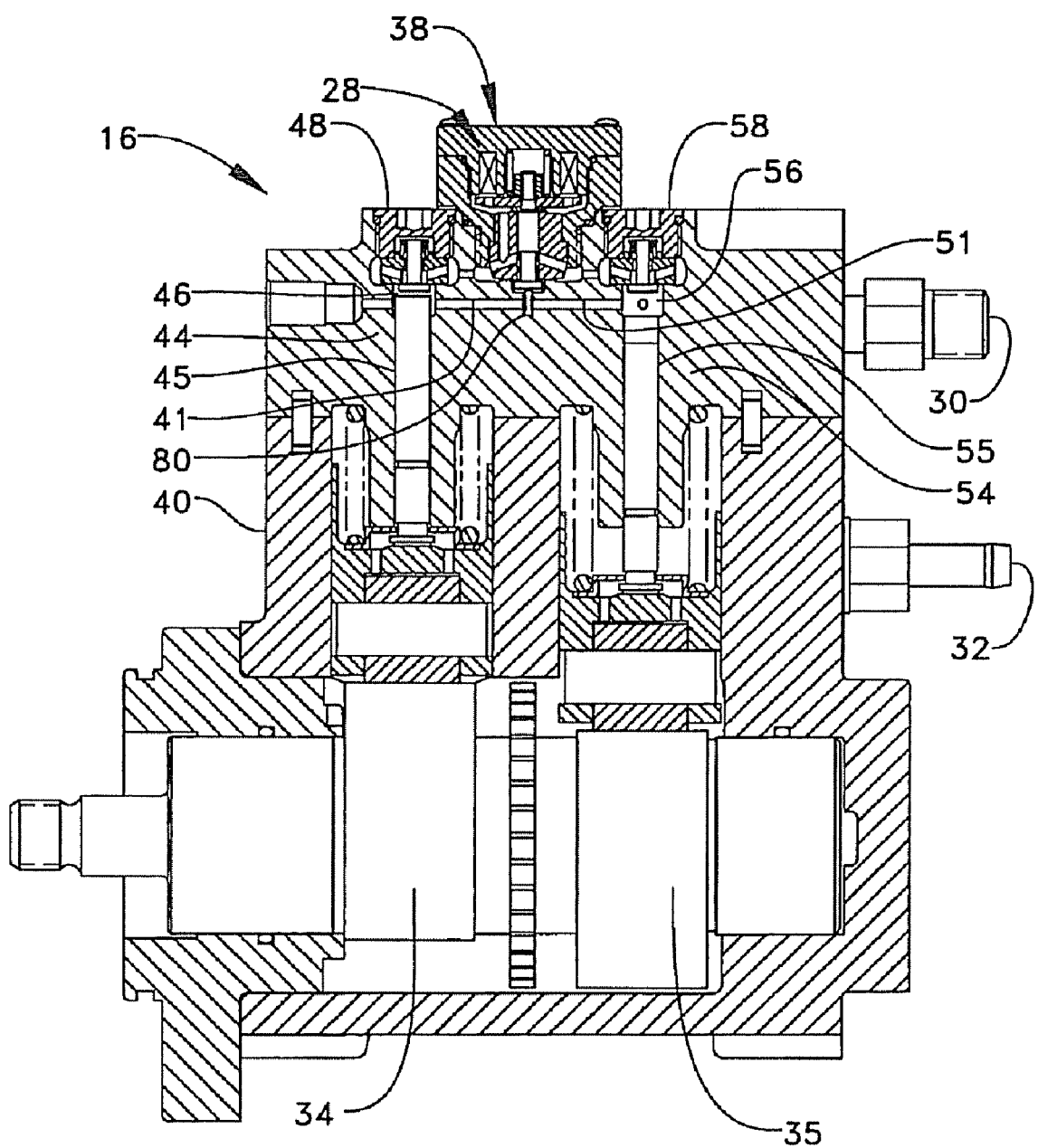
FIG. 2 is a front sectioned view of a pump used in the fuel system of FIG. 1.

Referring to FIGS. 1 and 2, the high pressure pump 16 includes a high pressure outlet 30 fluidly connected to the high pressure rail 20, a low pressure outlet 32 fluidly connected to the fuel tank 12, and an inlet 33 fluidly connected to the fuel transfer pump 14. The pump 16 includes a first plunger 45 positioned to reciprocate in a first pumping chamber 46 of a first barrel 44 and a second plunger 55 positioned to reciprocate in a second pumping chamber 56 of a second barrel 54. The first and second barrels 44, 54 may be portions of a common pump housing 40. First and second cams 34, 35 are operable to cause plungers 45, 55 to reciprocate out of phase with one another. Each of the cams 34, 35 may include three lobes such that one of the plungers 45 or 55 is undergoing a pumping stroke at about the time that one of the fuel injectors 22 is injecting fuel. Thus, cams 34, 35 are preferably driven to rotate directly by the engine at a rate that preferably synchronizes pumping activity to fuel injection activity in a conventional manner.

When the plunger 45 is undergoing its retracting stroke, fresh low pressure fuel is drawn into the pumping chamber 46 past a first inlet check valve 48 from a low pressure gallery 37 that is fluidly connected to inlet 33. Likewise, when the plunger 55 is undergoing its retracting stroke, fresh low pressure fuel is drawn into the second pumping chamber 56 past a second inlet check valve 58 from the shared low pressure gallery 37. When the first plunger 45 is undergoing its pumping stroke, fluid is displaced from the pumping chamber 46 either into the low pressure gallery 37 via the first spill passage 41 and the spill control valve 38, or into high pressure gallery 39 past the first outlet check valve 47. Likewise, when the second plunger 55 is undergoing its pumping stroke, fuel is displaced from the second pumping chamber 56 either into the low pressure gallery 37 via the second spill passage 51 and the spill control valve 38, or into the high pressure gallery 39 past second the outlet check valve 57.

Figure 3:
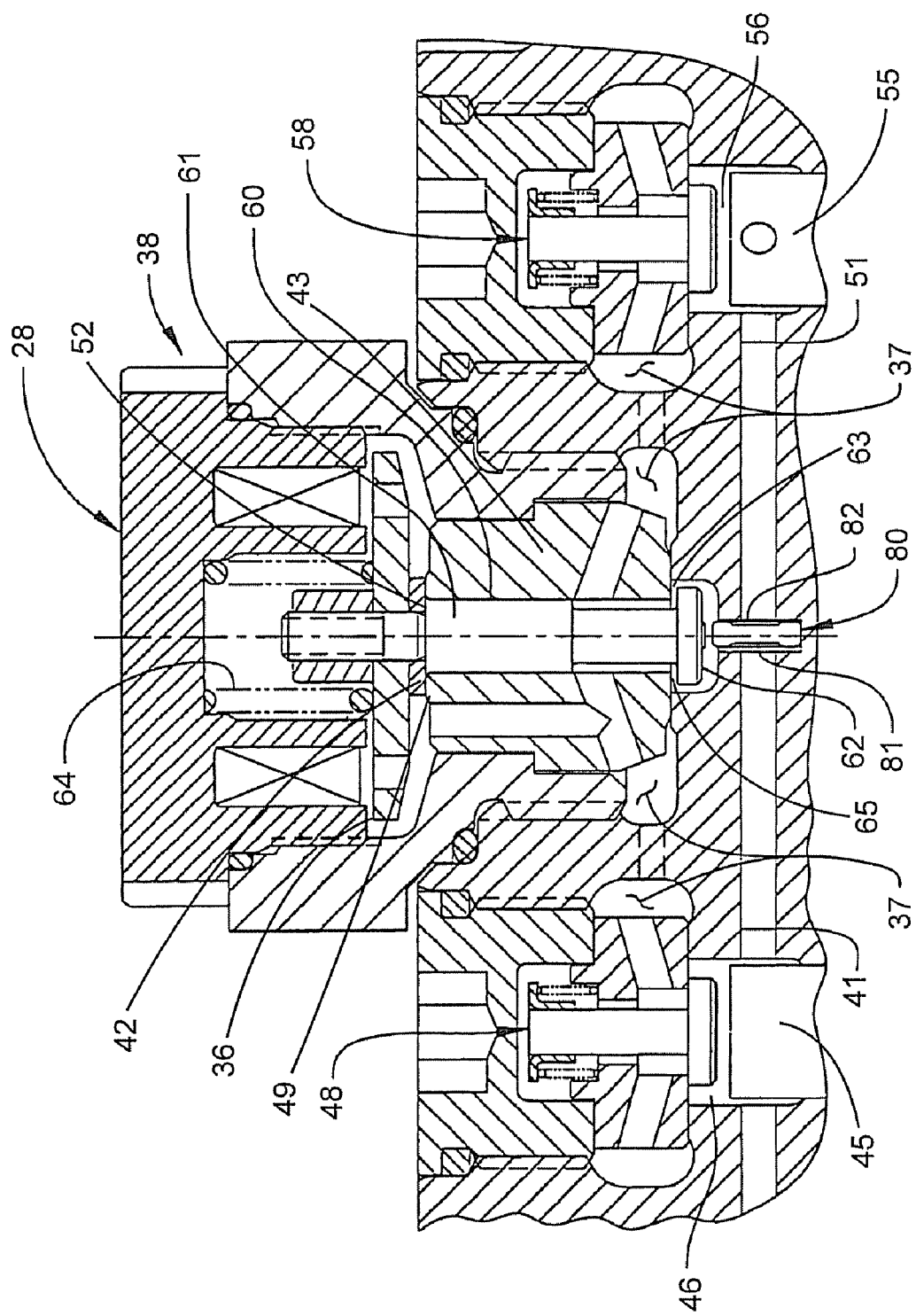
FIG. 3 is an enlarged front sectioned view of a spill control valve used in the pump of FIG. 2.

Referring to FIG. 3, the spill control valve 38 is providing having a structure that shares many features in common with known valves of its type. For instance, the spill control valve 38 includes a spill valve member 60 that includes a stem 61 and a closing hydraulic surface 62. The stem 61 extends through a valve block 43 and the surface 62 can be seated in a valve seat 63 formed in the valve block 43 so as to close the spill control valve 38. The spill valve member 60 is normally biased downward, toward its open position via a biasing spring 64. This, as shown in FIG. 3, creates an opening 65 between the closing surface 62 of the valve member 60 and the valve seat 63 of the valve block 43. However, the spill valve member 60 can be moved upward to seat the closing surface 62 in the valve seat 63 and thereby close the opening 65. In the illustrated embodiment, an electrical actuator 28, such as a solenoid, includes an armature 36 attached to move with spill valve member 60. Those skilled in the art will appreciate that electrical actuator 28 could take a variety of forms, including but not limited to piezo and/or piezo bender actuators.

The spill control valve 38 controls the discharge of both plungers 45, 55. To facilitate this control, a shuttle valve 80 is located between the plunger pumping chambers 46, 56 and the spill control valve 38. The pumping action of the first plunger 45 combined with the intake action of the second plunger 55 forces the shuttle valve 80 to a position that blocks fluid entry into the filling plunger 55 while providing an open path between the pumping plunger 45 and the spill control valve 38. The actuator 28 can be energized to move the spill control valve 38 to a closed position, e.g., to move the valve number 60 and the armature 36 upward so as to seat the sealing surface 62 in the seat 63, at any time during the pumping stroke of the pumping plunger 45. Closing the spill control valve 38 initiates a pressure increase in the chamber 46 associated with the pumping plunger 45, which causes the outlet check valve 47 to open, thereby delivering high pressure fuel to the high pressure fuel rail 20. The increase in pressure holds the shuttle valve 80 shut until the pumping plunger 45 slows and stops at the end of its motion, at which time force from a biasing element 64 can push the valve member 60 and the armature 36 down to open the spill control valve 38 in preparation for the pumping stroke of the second plunger 55.

As the second plunger 55 switches modes from filling to pumping and as the first plunger 45 switches from pumping to filling, the shuttle valve 80 moves to the other side of its cavity blocking fluid entry into the second plunger 45, and opening the path between the first plunger 55 and the spill control valve 38 allowing the spill control valve 38 to control the discharge of the second plunger chamber 56.

Referring again to FIG. 1, when the fuel system 10 is in operation, the cams 34, 35 rotate causing the pump plungers 45, 55 to reciprocate in the respective barrels 44, 54 out of phase with one another. When the first plunger 45 is undergoing its pumping stroke, the second plunger 55 will be undergoing its retracting stroke. This action is exploited via the shuttle valve member 80 to either connect the first pumping chamber 46 or the second pumping chamber 56 to the spill control valve 38. As one of the plungers 45 or 55 begins its pumping stroke, fluid is initially displaced from the appropriate pumping chamber 46 or 56 through the spill control valve 38 to the low pressure gallery 37.

When there is a desire to output high pressure from the variable displacement pump 16, the electrical actuator 28 is energized to move the valve member 60 and the armature 36 upward and close the spill control valve 38 by seating the sealing surface 62 in the valve seat 63. This causes fluid in the pumping chamber 46 or 56 to be pushed past the respective check valve 47 or 57 into high pressure gallery 39 and then into high pressure rail 20. Those skilled in the art will appreciate that the timing at which electrical actuator 28 is energized, and the responsiveness of the movement of the armature 36, determines what fraction of the of fluid displaced by the plunger 45 or 55 is pushed into the high pressure gallery 39 and the rail 20, and what other fraction is displaced back to the low pressure gallery 37. This operation serves as a means by which pressure can be maintained and controlled in the high pressure rail 20.

To facilitate the opening and closing of the spill control valve 38, which controls the volume and flow rate of fluid flow to the rail 20, and thereby maintain rail pressure stability, an anti-stiction spacer 42 is provided between a contact surface 49 of the valve block 43 and the armature 36. The spacer 42 reduces or prevents stiction from occurring between the valve block 43 and the armature 36, and by doing so, increases the responsiveness of the movement of the armature 36 by decreasing the amount of time and energy required for the armature 36 to break free from the valve block 43. The spacer 42 rests on a shoulder 52 of the spill valve member 60 and, accordingly, the spacer 42 moves with the armature 36 and the valve member 60. As shown in FIG. 3, when the spill control valve 38 is open, the spacer 42 abuts the contact surface 49 of the valve block 43. However, as the spill control valve 38 moves to the closed position, the moving valve member 60 lifts the spacer 42 from the contact surface 49. As described in more detail below, the spacer 42 is configured to reduce or eliminate stiction between the spacer 42 and the valve block 43 and thereby reduce the amount of time required to close the spill control valve 38.

Figure 4:
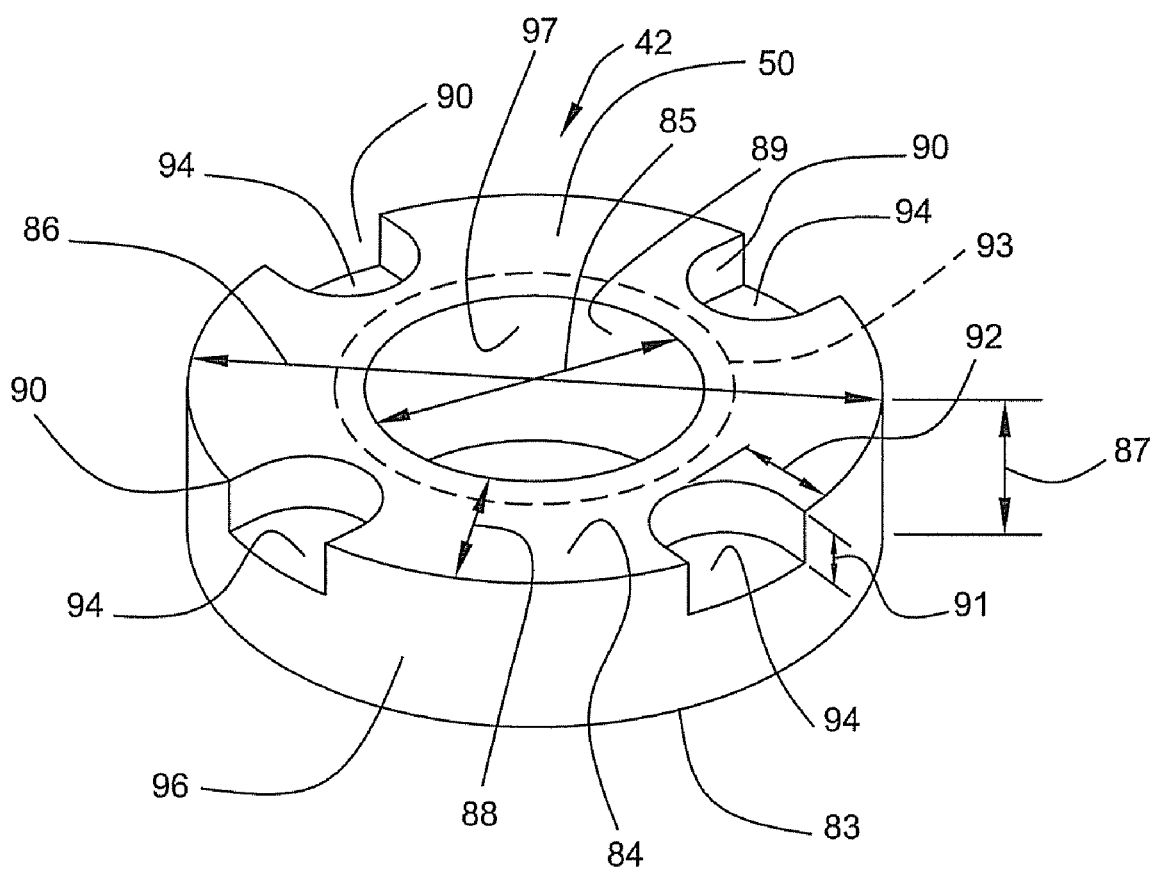
FIG. 4 is a perspective view of an anti-stiction spacer used in the pump of FIG. 2.

Referring to FIG. 4, the anti-stiction spacer 42 has a generally ring-shaped body having first and second facing surfaces 83, 84 and inner and outer diameters 85, 86. The first and second facing surfaces 83, 84 are separated by a thickness 87 and the inner and outer diameters 85, 86 are separated by a distance 88. The spacer 42 has an outer concentric edge 96 and an inner concentric edge 97, which defines a passage 89 that extends the entire thickness 87 of the spacer 42. The spacer 42 is positioned between the movable member, e.g., the armature 36, and the stationary member, e.g., the valve block 43, such that the first facing surface 83 is contactable with the armature 36 and the second facing surface 84 is contactable with the valve block 43, and the stem 61 of valve member 60 passes through the passage 89. The spacer 42 has a plurality of fluid receiving grooves 90 formed in the second facing surface 84 and spaced circumferentially around the outer edge 96. In the illustrated embodiment, the grooves 90 are spaced about the outer edge 96 every 90°. It should be appreciated, however, that the spacer 42 can be fixed to the contact surface 49 and the armature 36 can move in and out of contact with the spacer 42. In this arrangement, it should be appreciated that the grooves 90 may be formed in the first facing surface 83 to reduce stiction between the armature and the spacer 42, which, in this embodiment, is fixed to the valve block 43.

The grooves 90 axially extend from the second facing surface 84 through a portion 91 of the thickness 87. Additionally, the grooves 90 radially extend, inward from the outer edge 96 through a portion 92 of the distance 88. Because the grooves 90 radially extend a portion 92 of the distance 88, instead of the entire distance 88, an annular contact area, which is generally designated by dotted line 93, is provided for abutting the shoulder 52 of the valve member 60.

The grooves 90, by reducing the surface area of the second facing surface 84, reduce the area of contact between the spacer 42 and the contact surface 49 of the valve block 43. Because stiction is directly related to the area of contact, reducing the area of contact reduces stiction. In addition to reducing the area of contact, the grooves 90 reduce stiction by providing a surface 94 against which pressurized fuel may create a lifting force that offsets stiction. For example, when the spill valve 38 is open and the spacer 42 abuts the valve block 43, the surface 49 and each groove 90 combine to create a chamber having an opening along the outer edge 96 of the spacer 42. Pressurized fluid from the gallery 37 and/or the inlet 33 may enter each of the chambers and create a force acting against each surface 94. This offsetting force, combined with the reduced area of contact, reduces or eliminates stiction and reduces the time and energy required for the spacer 42, including the armature 36 and the valve member 60, to break free from the valve block 43 and close the spill valve 38. Accordingly, the spacer 42 enhances the ability of the pump 16 to control the frequency at which the spill valve 38 cycles between open and closed positions and, by doing so, the spacer 42 helps the pump 16 maintain rail pressure stability.

INDUSTRIAL APPLICABILITY

The industrial applicability of the anti-stiction spacer described herein will be readily appreciated from the foregoing discussion. The anti-stiction spacer of the present disclosure finds potential application in any hydraulic device in which a moveable component that is wetted with a highly viscous fluid comes in contact with the body of the device. For example, problems associated with stiction may occur in hydraulic devices in which the moveable component moves a relatively short distance, is required to move relatively quickly, and has mass properties that are relatively low. Thus, the present disclosure may be applied in hydraulically actuated fuel injectors and/or hydraulically actuated gas exchange valves that require relatively small light weight moveable components to move relatively short distance at extremely fast rates in the presence of what can be very highly viscous oil.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A spacer for use with a fluid device having a valve member connected to a movable member and extending through a stationary member, the stationary member having a valve seat for receiving a sealing surface of the valve member, the movable member being movable toward and away from the stationary member for seating and unseating the sealing surface of the valve member in and out of the valve seat, the spacer comprising:

a generally ring-shaped body with first and second facing surfaces separated by a thickness and inner and outer concentric edges, the spacer positioned between the movable member and the stationary member such that the first facing surface is contactable with the movable member and the second facing surface is contactable with the stationary member, the spacer having at least one fluid receiving groove formed in at least one of the first and second facing surfaces extending axially from one of the first and second facing surfaces through a portion of the thickness, the groove radially extending inwardly from the outer edge.

2. The spacer of claim 1, wherein the groove is formed in the second facing surface.

3. The spacer of claim 1, wherein four grooves are formed in at least one of the first and second facing surfaces.

4. The spacer of claim 3, wherein the grooves are concentrically spaced every 90° about the outer edge of the body.

5. A fuel system for an engine comprising:

a pump having an inlet and an outlet;

a fuel rail fluidly connected to the outlet of the pump;

a plurality of fuel injectors fluidly connected to the fuel rail via respective branch passages;

the pump including a first plunger within a first pumping chamber and a spill valve having a valve member extending through a valve block and movable between open and closed positions; and a spacer having a generally ring-shaped body with first and second facing surfaces separated by a thickness and inner and outer concentric edges, the spacer positioned between an armature and the valve block such that the first facing surface is contactable with the armature and the second facing surface is contactable with the valve block, the spacer having at least one fluid receiving groove formed in at least one of the first and second facing surfaces extending axially from one of the first and second facing surfaces through a portion of the thickness, the groove radially extending inwardly from the outer edge.

6. The fuel system of claim 5, wherein the wherein the groove is formed in the second facing surface of the spacer for providing a reduced area of contact between the spacer and the valve block.

7. The fuel system of claim 5, wherein four grooves are formed in at least one of the first and second facing surfaces.

8. The spacer of claim 7, wherein the grooves are concentrically spaced every 90° about the outer edge of the body.

* * * * *